United States Patent
Dunton et al.

(10) Patent No.: US 7,606,393 B2
(45) Date of Patent: Oct. 20, 2009

(54) IMAGE SELECTION BASED ON IMAGE CONTENT

(75) Inventors: Randy R. Dunton, Phoenix, AZ (US); Lawrence A Booth, Jr., Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 273 days.

(21) Appl. No.: 11/703,989

(22) Filed: Feb. 7, 2007

(65) Prior Publication Data

US 2007/0177798 A1 Aug. 2, 2007

Related U.S. Application Data

(62) Division of application No. 10/678,888, filed on Oct. 2, 2003, now Pat. No. 7,194,131, which is a division of application No. 08/996,960, filed on Dec. 23, 1997, now Pat. No. 6,678,393.

(51) Int. Cl.
  *G06T 7/00* (2006.01)
  *G06K 9/46* (2006.01)
  *G06K 9/62* (2006.01)
  *G06K 9/78* (2006.01)

(52) U.S. Cl. .............. 382/103; 382/170; 382/172; 382/165; 382/217

(58) Field of Classification Search .......... 382/103, 382/170, 165, 209, 217–219, 172; 348/143, 348/129, 130
See application file for complete search history.

(56) References Cited

U.S. PATENT DOCUMENTS

| | | | |
|---|---|---|---|
| 3,759,152 A | 9/1973 | Fletcher et al. | |
| 3,934,259 A | 1/1976 | Krider | |
| 4,075,604 A * | 2/1978 | Degasperi | 382/165 |
| 4,567,610 A | 1/1986 | McConnell | |
| 4,679,077 A | 7/1987 | Yuasa | |
| 5,003,616 A | 3/1991 | Orita | |
| 5,012,522 A | 4/1991 | Lambert | |
| 5,052,044 A | 9/1991 | Gaborski | |
| 5,057,820 A | 10/1991 | Markson | |
| 5,083,200 A | 1/1992 | Deffontaines | |
| 5,109,274 A | 4/1992 | Washio | |

(Continued)

FOREIGN PATENT DOCUMENTS

DE 19511713 3/1995

OTHER PUBLICATIONS

U.S. Appl. No. 37/003,336, filed Oct. 24, 1972, Clegg.

(Continued)

*Primary Examiner*—Scott A Rogers
(74) *Attorney, Agent, or Firm*—Blakely, Sokoloff, Taylor & Zafman LLP

(57) ABSTRACT

An image capture system comprises an image input and processing unit. The image input obtains image information which is then passed to the processing unit. The processing unit is coupled to the image input for determining image metrics on the image information. The processing unit initiates a capture sequence when the image metrics meet a predetermined condition. The capture sequence may store one or more images, or it may indicate that one or more images have been detected. In one embodiment, the image input is a CMOS or CCD sensor.

16 Claims, 5 Drawing Sheets

U.S. PATENT DOCUMENTS

| | | | |
|---|---|---|---|
| 5,184,215 A * | 2/1993 | Barker | 348/143 |
| 5,396,220 A | 3/1995 | Markson | |
| 5,448,161 A | 9/1995 | Byerley | |
| 5,793,888 A | 8/1998 | Delanoy | |
| 5,900,950 A | 5/1999 | Hsu | |

OTHER PUBLICATIONS

Forsyth, et al., "Searching for Digital Pictures", Scientific American, Jun. 1997, pp. 88-93.

* cited by examiner

IMAGE SELECTION BASED ON IMAGE CONTENT

CROSS-REFERENCE TO RELATED APPLICATION

This application is a Divisional of application Ser. No. 10/678,888, filed Oct. 2, 2003 now U.S. Pat. No. 7,194,131 entitled "IMAGE SELECTION BASED ON IMAGE CONTENT" which is a Divisional of Ser. No. 08/996,960 filed Dec. 23, 1997 now U.S. Pat. No. 6,678,393.

BACKGROUND OF THE INVENTION

1. Field of the Invention

The described invention relates to the field of imaging. In particular, the invention relates to the selection of an image based on the content of the image.

2. Description of Related Art

Image capture devices, such as still and video cameras, typically have stored images based upon the input of a trigger from the user. Sometimes the trigger is manually input, for example, by pushing a button. The trigger may alternatively be triggered remotely via a coupling to a flash strobe, or through a timer.

Some events, however, are very difficult to trigger upon. As an example, capturing an image of lightning during a lightning storm is very difficult to capture because of the unpredictability of the event, as well as the quick timing that is needed to capture the event.

One way in which lightning could be captured is by taking a video picture of the sky, and hoping that lightning strikes during the time the video is capturing images (the capture period). However, this method fails in several respects.

First, the quality of video is typically not as good as that of a still picture. Second, because the video image must be stored, the capture period is limited to the amount of storage space in the camera. This is restrictive when the target image may take a very long time to happen. Finally, a person has to either be present during the capture period to observe whether lightning had struck to know whether the target image was captured, or the user potentially has to review the entire video to see whether the desired event occurred. A more automated method of detecting a target image is desirable.

SUMMARY OF THE INVENTION

An image capture system comprises an image input and processing unit. The image input obtains image information which is then passed to the processing unit. The processing unit determines an image metric from the image information. The processing unit initiates a capture sequence when the image metric meets a predetermined condition. The capture sequence may store one or more images, or it may indicate that one or more images have been detected. In one embodiment, the image input comes from an image sensor, such as a CMOS or CCD sensor. In another embodiment, the image input comes from a video stream.

DETAILED DESCRIPTION

Figure 1:
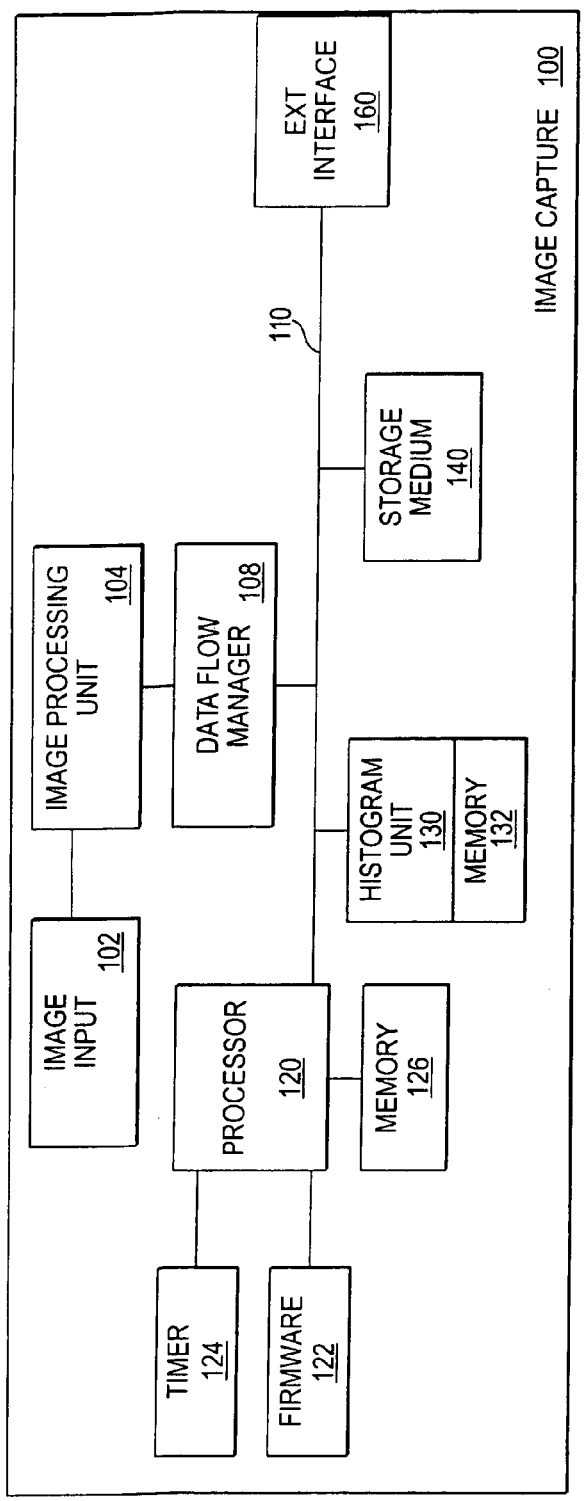
FIG. 1 shows an image capture system in accordance with one embodiment of the invention.

An apparatus and method for determining when one or more images match an image profile are described. In a first embodiment, the images are sampled by an image sensor in a camera. The image profile comprises one or more thresholds of image metrics such as color content and light intensity information. The images from the image sensor are processed and compared against the image metrics of the image profile. If a match is found, as will be described later, then the camera triggers a capture sequence in which one or more images are saved to a storage medium. The capture sequence may save a single image, or if desired, the capture sequence may save multiple images. If images are buffered, images sampled prior to the trigger of the capture sequence can also be saved to the storage medium, as will be described in more detail later.

In a second embodiment, the images are provided from a collection of images or a video stream, for example, a television signal, VCR output, or digital video diskette (DVD) output. The images from the video stream are processed and compared against the image metric thresholds set up in the image profile to find a match. This is useful for searching a video stream for a particular image. For example, after a video camera is used to capture images, this second embodiment can be used to automatically determine whether a desired image is within the capture period. This frees the user from having to be present during the capture period.

When an image matches the image profile, i.e., all thresholds are reached, a capture sequence is initiated. This may result in one or more images being stored to a storage medium, or it may result in an indication that the image was found in the video stream. Information about the location or a time index of the identified image may also be saved.

Image metrics are derived from various components of an image. In one embodiment image metrics include, but are not limited to, color content and light intensity information. Examples of triggering a capture sequence based upon color content follow. A camera focused on a tree can detect when a bluebird enters the image by triggering on the blue content in the image. When the blue content exceeds a specified threshold set up in the image profile, an image capture is triggered. Similarly, the camera can be set up to trigger on the bluebird leaving the image by monitoring the blue content in the image and triggering a capture sequence when the blue content falls below a specified threshold. The blue content can be further specified to trigger only upon a particular shade of blue in order to capture images of only a particular bluebird, or a particular species of bluebird.

In a preferred embodiment, the thresholds of the image metric(s) that comprise the image profile can be programmed via an interface. The image profile can be set to readily match one or more color metrics of an image, or the image profile may be set so that there is rarely a match with the one or more color metrics of an image. For example, the trigger may be set up so that minor variations in image content will not trigger a capture sequence.

The image profile can also be set up based upon a rate of change of an image metric. For example, lightning is characterized by a rapid change in light intensity, or luminosity. An image of lightning may be captured by specifying a rate of change of luminosity in the image profile. When the detected rate of change of luminosity exceeds the specified rate of change of the image profile, a capture sequence is initiated. However, a slow rate of change of luminosity corresponding, for example, to a sunrise or a sunset can be set up to not trigger a capture sequence.

FIG. 1 shows an image capture system 100 in accordance with one embodiment of the invention. The image capture system includes an image input 102, an image processing unit 104, a processor 120, and a storage medium 140.

The image input 102 captures image information using technology that is well known in the art. In one embodiment, the image input 102 is a complementary metal oxide semiconductor (CMOS) sensor. However, the image input 102 could alternatively be a charge couple device (CCD) sensor or other type of image sensor. The image input may also be an interface which receives a video stream from a television, satellite broadcast, VCR, or other digital video recording. The image input 102 is coupled to provide image information to the image processing unit 104. Image processing unit 104 may include color look up tables for adjusting color values to pixel data. The image processing unit 104 may also include a compression unit for compressing the image information. In one embodiment, a data flow manager 108 couples the image processing unit 104 to a bus 110.

In one embodiment, processor 120, histogram unit 130, and storage medium 140 are coupled to bus 110. The processor 120 is coupled to receive instructions from firmware (or alternatively memory) 122 for instructing the processor what operations to perform. The processor optionally is also coupled to timer 124 which provides a timing input so that processor 120 can determine a rate of change of the image metric(s) generated by the histogram unit 130, as will be explained next. In one embodiment, memory unit 126 is coupled to processor 120 for storing the image profile which includes one or more threshold values of image metric(s). The threshold values are compared against the image metric(s) generated by the histogram unit 130.

Histogram unit 130 is coupled to receive image information from the image processing unit 104. In one embodiment, the data flow manager 108 transfers the image information to the histogram unit 130, and the histogram unit 130 determines one or more image metrics from the image information. The data flow manager may be a DMA, as one example. In one embodiment, the histogram unit generates colorimetric data such as the amount of red, green, and blue (RGB) components. Alternatively, the histogram unit 130 can determine other colorimetric data. For example, it can determine cyan, magenta, yellow, and light intensity (CMYK) data. The histogram unit 130 may also determine photometric data. Photometric data includes light intensity, or luminosity, measured in either absolute or relative scales. However, the image metrics are not limited to color and light intensity; other image metrics can be determined from the image information. In one embodiment, the image information is temporarily stored in memory 132 while the histogram unit 130 determines image metrics.

The processor 120 compares the image metrics generated by the histogram unit 130 with its image profile. In one embodiment, for each image metric, the image profile indicates a threshold value and whether a match for that image metric is met according to whether the measured image metric is below or above the threshold. Alternatively, for each image metric, two thresholds may be specified, with a match occurring only if the measured image metric is above a first threshold and below a second threshold. Threshold levels will be discussed in more detail later.

Storage medium 140 is used to store the image information when the image metrics determined from the image information matches the image profile, i.e., all thresholds are met. In one embodiment, one or more images are temporarily stored in memory area 132 prior to being stored to storage medium 140. By buffering the images into memory area 132, the images prior to finding a capture sequence can be saved. In one embodiment, various combinations of the firmware 122 and memories 122, 126, 132, and 140 may be combined together within a single unit.

External interface 160 is can be used for downloading the saved images from storage medium 140. External interface 160 can also be used to input the image profile.

Figure 2:
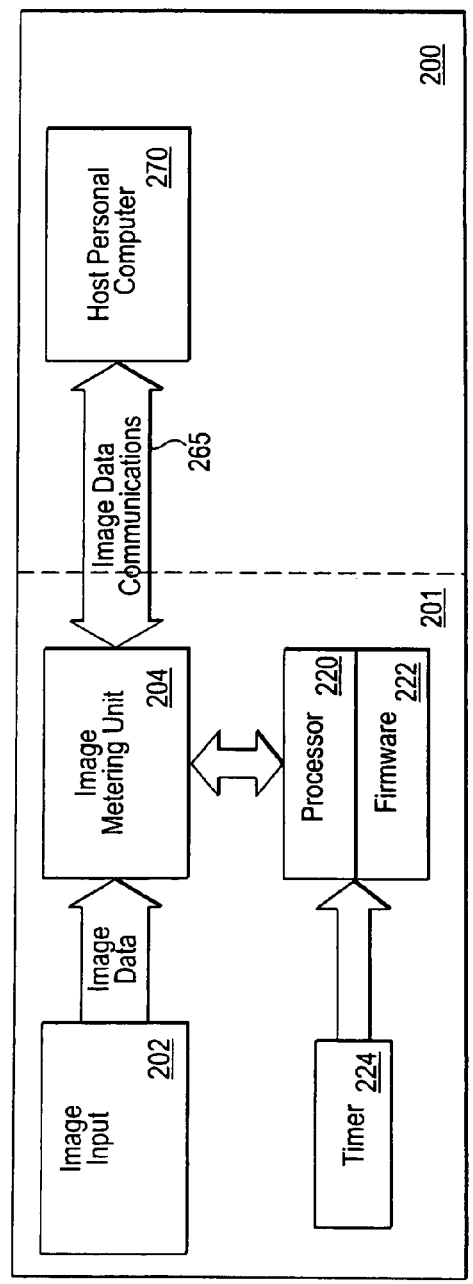
FIG. 2 shows another embodiment of an image capture system.

FIG. 2 shows an alternate embodiment of an image capture system 200. Image capture portion 201 includes an image input 202, processor 220, firmware 222, and timer 224 that are similar to their counterparts of the same name in FIG. 1. Image metering unit 204 incorporates image processing unit 104, data flow manager 108, and histogram unit 130. A host personal computer is coupled to the image metering unit 204 via a communication link 265.

The host personal computer may provide the input of the image profile to the image capture portion 201 via the communication link 265. In one embodiment, a storage medium can be included in host personal computer 270 so that it need not reside in the image capture portion 201. The host personal computer 270 may also implement the histogram unit 130 function in software or hardware.

Triggering a Capture Sequence

Figure 3:
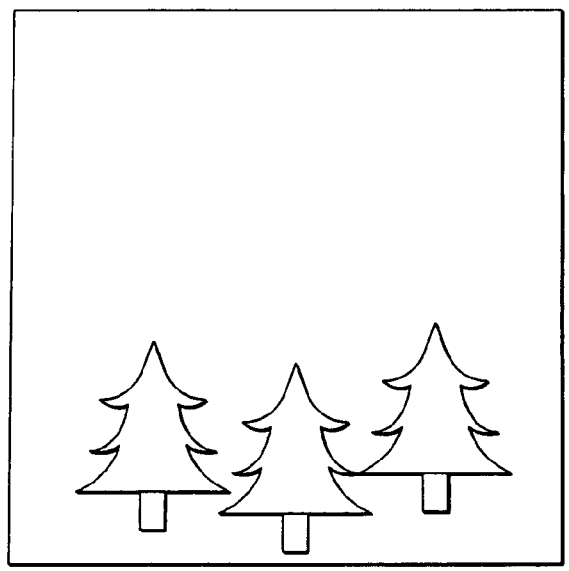
FIG. 3 shows a representation of an image sampled by the image capture device 201.
Figure 4:
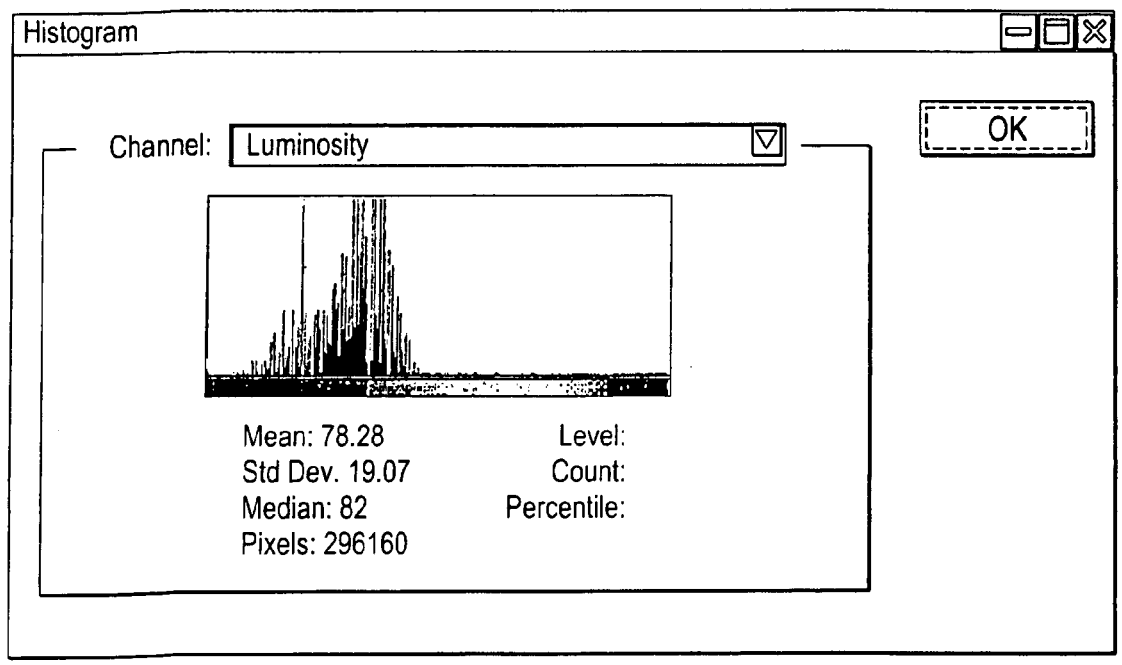
FIG. 4 shows a representative histogram of the luminosity corresponding to the image of FIG. 3.

FIG. 3 shows a representation of an image of a night-time scene sampled by the image capture device 201. FIG. 4 shows a representative histogram of the luminosity corresponding to the image of FIG. 3. On the horizontal axis is the level of the luminosity. On the vertical axis is the count of the luminosity per each level.

In one embodiment, a background image such as FIG. 3 is captured by the image capture device 201. A histogram of the image determines image metric(s) which are then compared to subsequent sampled images. An image profile is generated having one or more thresholds associated with the image metric(s) of the background image.

Figure 7:
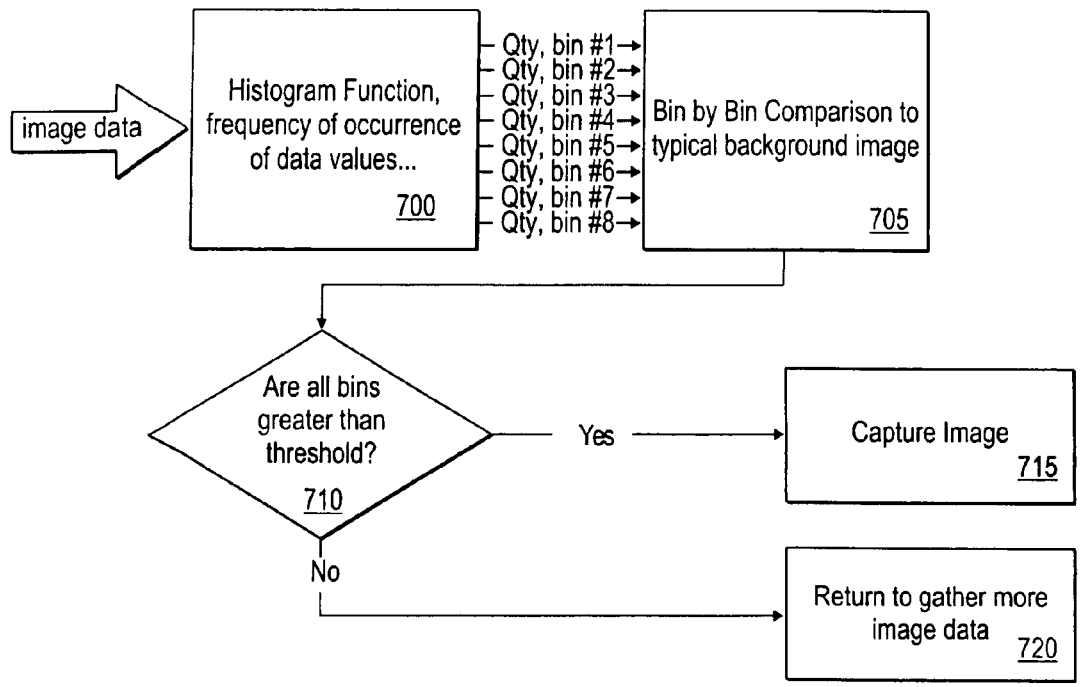
FIG. 7 shows an embodiment of a triggering mechanism.

FIG. 7 shows an embodiment of a triggering mechanism. At block 700, a histogram of image data is determined. At block 705, the count of one or more levels of the luminosity is compared against an image profile derived from the histogram of the background image. At decision block 710, if the counts of the one or more levels of the luminosity are greater than the image profile thresholds, then a capture sequence is initiated (block 715). However, if the comparisons are not all greater than the typical background image, then another image is sampled (block 720).

The image profile thresholds can be preset to any amount or percentage above the typical background image. For example, it can be set to 5%, or 10% above the typical background image. Alternatively, it could be set at a preset amount or percentage less than typical background image.

Figure 8:
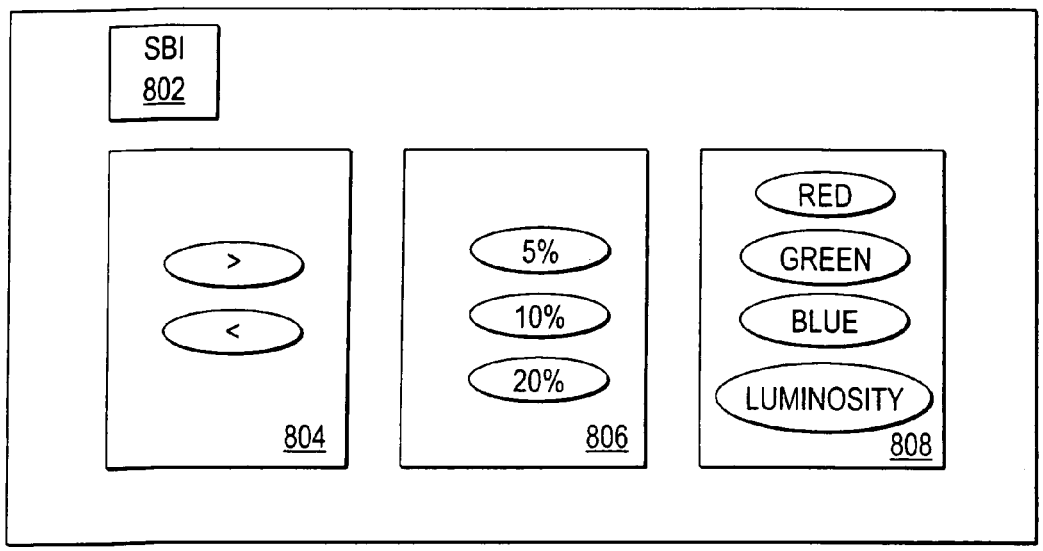
FIG. 8 shows an example of an interface that may be used on the image capture device.

FIG. 8 shows an example of an interface that may be used with the image capture device. A "SBI" button 802 for sampling the background image generates a histogram and image metrics for a background image. Preset variations based on the background image can be easily chosen by selecting a few buttons: one set of buttons 804 indicating a threshold "greater than" or "less than" the histogram of the background image, one set of buttons 806 indicating by how much (5%, 10%, or 20%), and one set of buttons 808 indicating which image metric(s) to compare. The image metrics, for example, may include red, green, blue, and luminosity.

The interface for inputting complex threshold data via buttons, however, may be restrictive. Thus, using a graphical interface may be more suited to the task.

Figure 9:
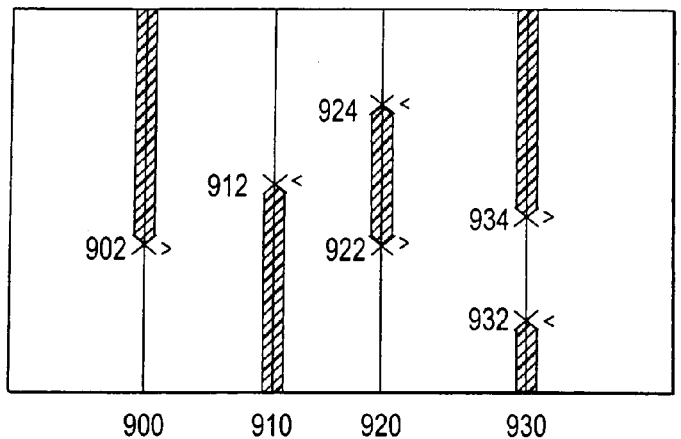
FIG. 9 shows a graphical interface in which various thresholds are identified at several levels of an image metric.

FIG. 9 shows a graphical interface in which various thresholds are identified for several levels of an image metric. For the thresholds labeled as '>', a capture sequence is triggered when an image metric at that level has a measured count above the threshold. For the thresholds labeled as '<', a capture sequence is triggered when an image metric at that level has a measured count below the threshold.

As an example, FIG. 9 shows a first image metric 900 that is set up to trigger a capture sequence when the measured count for that image metric is above the threshold 902. A second image metric 910 is set up to trigger a capture sequence when the measured count for that image metric is below the threshold 912. A third image metric 920 is set up to trigger a capture sequence when the measured count for that image metric is below the threshold 924 but above the threshold 922, and a fourth image metric 930 is set up to trigger a capture sequence when the measured count for that image metric is above the threshold 934 or below the threshold 932. In one embodiment, all of the image metric (e.g., 900, 910, 920 and 930) threshold requirements must be met to trigger the capture sequence. In another embodiment, only one or any combination of image metric (e.g., 900, 910, 920, or 930) threshold requirements needs to be met to trigger the capture sequence.

In one embodiment, the camera includes an interface such as an LCD screen and either buttons or a graphical interface so that the image profile thresholds can be entered into the camera.

One method of generating an image profile suitable for initiating a capture sequence creates a mock up image that looks similar to the desired image. The mock up image can be created, for example, by using software to modify a background image. Alternatively, an image similar to that desired can be scanned into a computer, using well-known techniques. A histogram can then be generated from the mock up image using either software or hardware to model the histogram. The histogram of the mock up image can then be compared against the histogram of a background image captured by the image capture device. One or more thresholds based on the image metric(s) of the histograms can be set up so that a desired image will initiate a capture sequence.

Figure 5:
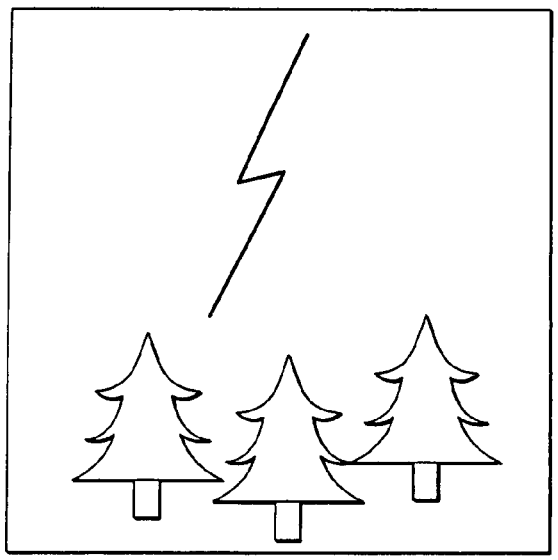
FIG. 5 shows a representation of an image that was created via a computer program.
Figure 6:
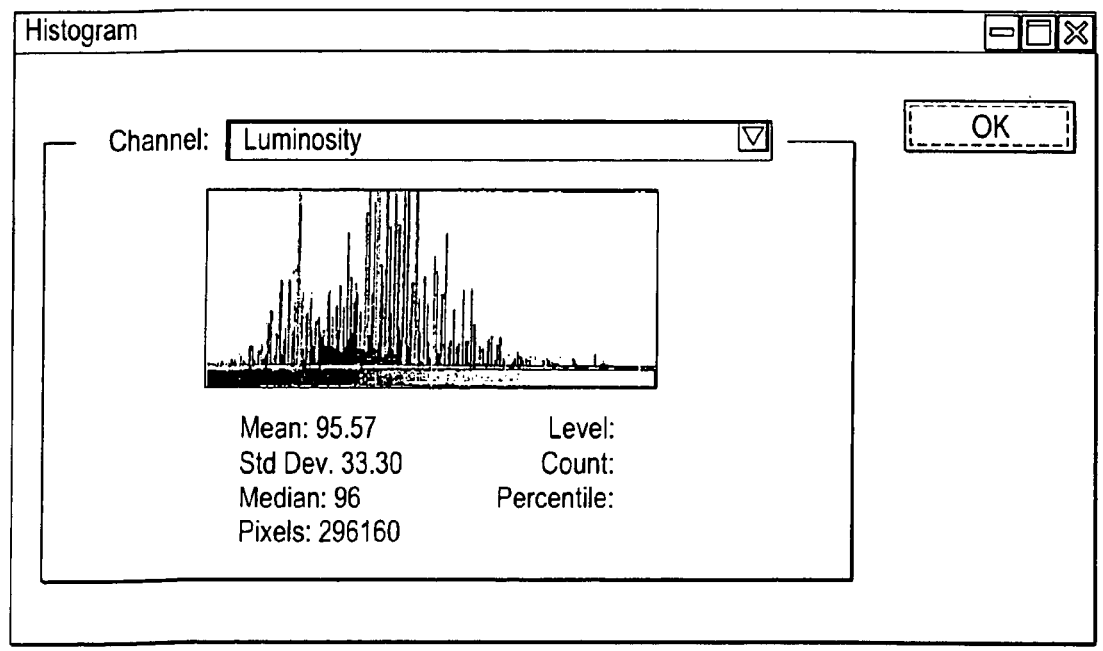
FIG. 6 shows a representative histogram of the luminosity corresponding to the image of FIG. 5.

For example, FIG. 5 shows a representation of an example of an image that was created via a computer program. FIG. 6 is a representative histogram of the luminosity corresponding to the image of FIG. 5. In one embodiment, a background image is taken with the image capture device 201. The image is modified on host computer 270. A histogram of both the background image and the modified image are created using software residing on the host computer 270. The two histograms are compared against each other to determine which image metric(s) are best suited for use as a threshold to initiate a capture sequence.

In the case of FIGS. 5 and 6, which correspond to lightning striking during the night, the count of the luminosity is clearly much higher at several levels than that of FIGS. 3 and 4.

In one embodiment, a user manually determines one or more the image metric thresholds. In another embodiment, software determines the image metric threshold(s) by comparing the two or more histograms. The software determines one or more levels in the histograms in which the two image metrics differ the greatest. The software then creates one or more thresholds from the background image, making sure that the threshold is above the background image and allowing a margin to account for noise. The host computer 270 then communicates the threshold information to the image capture device 201. The host computer can then be disconnected from the image capture device 201, if desired.

Figure 10:
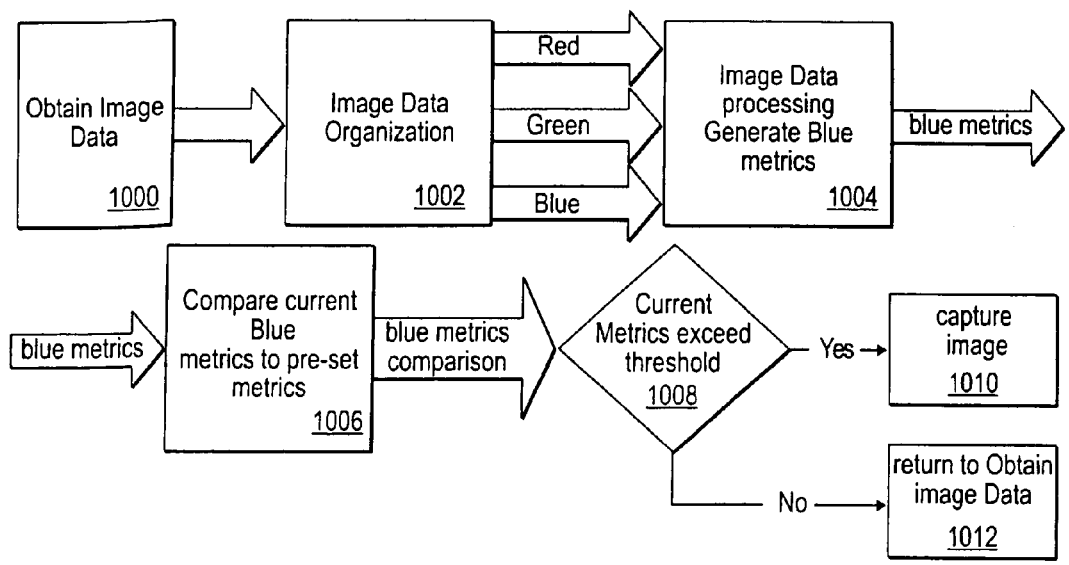
FIG. 10 shows an example of a trigger system set up to measure the blue component of an image.

FIG. 10 shows an example of an image capture system set up to initiate a capture sequence based on the image metric of color content. This example initiates the capture sequence based on blue content. However, the image profile can be set up based on other colorimetric or photometric data.

The image information is obtained at block 1000. At block 1002 the image information is broken down into red, green and blue components. At block 1004, the blue component of the image data is processed to provide image metrics for the blue component. At block 1006, the blue component metrics are compared against the image profile. If the blue image metric(s) meet each of the one or more image profile thresholds (i.e., match the image profile) then the image is captured at block 1010. If at block 1008, the blue image metric(s) do not meet all of the one or more thresholds, then the image is not captured. Instead, the flow sequence restarts at block 1000, and image information from another image is obtained.

Thus, an apparatus and method determining when one or more images meet an image profile is disclosed. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A method of detecting that an image meets a predetermined image profile, comprising:
   sampling a first image;
   determining an image metric for the first image;
   comparing the image metric for the first image with the predetermined image profile using a processor; and
   storing the first image when the image metric for the first image matches the predetermined image profile,
      wherein the predetermined image profile is generated by the steps of:
      creating a mock up image;
      determining an image metric associated with the mock up image;
      selecting one or more threshold values; and
      forming the predetermined image profile from the selected threshold values.

2. The method of claim 1 wherein the image metric comprises a luminosity component, and the predetermined image profile is matched when the luminosity component reaches a predetermined threshold.

3. The method of claim 1 wherein the image metric comprises a color component, and the predetermined image profile is matched when the color component reaches a predetermined threshold.

4. The method of claim 1, wherein sampling the first image comprises:

capturing an image through any one of a CMOS or a CCD sensor.

5. The method of claim 1, wherein sampling the first image comprises:
receiving an input from a video stream.

6. The method of claim 1, wherein the image profile data includes colorimetric data or photometric data.

7. A method of detecting that an image meets a predetermined image profile, comprising:
sampling a first image;
determining an image metric for the first image;
comparing the image metric for the first image with the predetermined image profile using a processor; and
storing the first image when the image metric for the first image matches the predetermined image profile,
wherein the image includes user defined thresholds.

8. A method of detecting that an image meets a predetermined image proifle, comprising:
sampling a first image;
determining an image metric for the first image;
comparing the image metric for the first image with the predetermined image profile using a processor; and
storing the first image when the image metric for the first image matches the predetermined image profile,
wherein the image profile is derived from a histogram of a background image.

9. A machine readable medium having instructions stored therein, which when executed, cause a machine to perform a set of operations comprising:
sampling a first image;
determining an image metric for the first image;
comparing the image metric for the first image with the predetermined image profile; and
storing the first image when the image metric for the first image matches the predetermined image profile,
wherein the predetermined image profile is generated by the steps of:
creating a mock up image;
determining an image metric associated with the mock up image;
selecting one or more threshold values; and
forming the predetermined image profile from the selected threshold values.

10. The machine readable medium of claim 9, wherein the image metric comprises a luminosity component, and the predetermined image profile is matched when the luminosity component reaches a predetermined threshold.

11. The machine readable medium of claim 9, wherein the image metric comprises a color component, and the predetermined image profile is matched when the color component reaches a predetermined threshold.

12. The machine readable medium of claim 9, wherein sampling the first image comprises:
capturing an image through any one of a CMOS or a CCD sensor.

13. The machine readable medium of claim 9, wherein sampling the first image comprises:
receiving an input from a video stream.

14. The machine readable medium of claim 9, wherein the image profile data includes colorimetric data or photometric data.

15. A machine readable medium having instructions stored therein, which when executed, cause a machine to perform a set of operations comprising:
sampling a first image;
determining an image metric for the first image;
comparing the image metric for the first image with the predetermined image profile; and
storing the first image when the image metric for the first image matches the predetermined image profile,
wherein the image includes user defined thresholds.

16. A machine readable medium having instructions stored therein, which when executed, cause a machine to perform a set of operations comprising:
sampling a first image;
determining an image metric for the first image;
comparing the image metric for the first image with the predetermined image profile; and
storing the first image when the image metric for the first image matches the predetermined image profile,
wherein the image profile is derived from a histogram of a background image.

* * * * *